United States Patent [19]

Naka et al.

[11] Patent Number: 5,577,175

[45] Date of Patent: Nov. 19, 1996

[54] 3-DIMENSIONAL ANIMATION GENERATING APPARATUS AND A METHOD FOR GENERATING A 3-DIMENSIONAL ANIMATION

[75] Inventors: Toshiya Naka, Osaka; Yoshimori Nakase, Kawachinagano, both of Japan

[73] Assignee: Matsushita Electric Industrial Co., Ltd., Osaka, Japan

[21] Appl. No.: 285,967

[22] Filed: Aug. 4, 1994

[30] Foreign Application Priority Data

Aug. 6, 1993 [JP] Japan ................................. 5-195867

[51] Int. Cl.⁶ .............................. G06T 15/20; G06T 15/70
[52] U.S. Cl. ........................................... 395/127; 395/173
[58] Field of Search .................................. 395/119, 126, 395/127, 152, 154

[56] References Cited

U.S. PATENT DOCUMENTS

| | | | |
|---|---|---|---|
| 4,600,919 | 7/1986 | Stern | 345/122 |
| 4,616,217 | 10/1986 | Nesbitt et al. | 395/121 |
| 4,752,836 | 6/1988 | Blanton et al. | 358/342 |
| 4,845,643 | 7/1989 | Clapp | 395/127 |
| 4,952,922 | 8/1990 | Griffin et al. | 395/121 |
| 5,010,502 | 4/1991 | Diebel et al. | 395/119 |
| 5,103,217 | 4/1992 | Cawley | 395/129 |
| 5,261,041 | 11/1993 | Susman | 395/152 |

FOREIGN PATENT DOCUMENTS

| | | |
|---|---|---|
| 0315051 | 5/1989 | European Pat. Off. . |
| 2-184188 | 7/1990 | Japan . |

OTHER PUBLICATIONS

Foley et al; *Computer Graphics; Principles and Practice;* 1990; pp. 229–281, 471–477, 521–528, 657–665, 745–753, 1064–1080.

*Primary Examiner*—Mark K. Zimmerman
*Attorney, Agent, or Firm*—Ratner & Prestia

[57] ABSTRACT

A 3-dimensional animation generating apparatus includes an image data storing section, a view point information input section, an image supervising section, an image data selecting section, a view point coordinate transforming section, an output image drawing section, a motion addressing section, a shadow area detecting section, and a shadow area supervising section. The image data storing section stores part image data and background image data in association with 3-dimensional coordinates of vertexes included in the image. The image data selecting section searches the image data by a unit of part. The apparatus further comprises a mechanism which, when information related to an observing view point is provided, determines which part image data exists in the visible area, transforms the visible part image data from the observing view point by view point coordinate transformation, and draws the resultant image data in a common drawing area. In addition, the apparatus further searches and supervises the part which can provide a shadow as a shadow area and the position of the light source related with the specific shadow area. When a new view point is selected, the shadow area transformed by view point coordinate transformation is drawn. Thus, the number of data and number of calculations for generating a scene with respect to a selected observing view point are effectively reduced.

20 Claims, 8 Drawing Sheets

Scene 1

3-DIMENSIONAL ANIMATION GENERATING APPARATUS AND A METHOD FOR GENERATING A 3-DIMENSIONAL ANIMATION

BACKGROUND OF THE INVENTION

1. Field of the Invention

The present invention relates to a 3-dimensional animation generating apparatus, having good interactivity, to be used in computergraphics (hereinafter abbreviated as CG) and in various image processing fields for processing scenes which are generated by a computer so as to generate continuous animation substantially in real time. The present invention also relates to a 3-dimensional animation generating method using such apparatus.

2. Description of the Related Art

In order to obtain animation of high image quality, it is necessary to improve the quality of image per frame (e.g., the spatial frequency, and the number of gray-scale levels). Also, it is necessary to increase the resolution along a time axis, i.e., the number of frames per unit time. Thirty frames or more per second are required for realizing animation with an image quality equivalent to that of the current NTSC-standard TV.

In a conventional method for generating CG animation, it takes a considerably long time to generate an image for each frame (hereinafter referred to as the frame image). Then, respective frame images thus generated are sequentially recorded on a video film, thereby obtaining animation. In such a conventional method, it is difficult to generate animation in real time. However, the conventional method is useful in a conventional CG application which requires animation with a high image quality.

On the other hand, in the image processing field, animation is often generated by a method called key-frame interpolation. In this method, some reference frames (hereinafter referred to as key frames) along the time axis are selected, and frame images between respective key frames are interpolated by utilizing the similarities between the frame images in the key frames. More specifically, the interpolation is performed by detecting or estimating a motion vector originating from the key frame for each of pixels which constitute an object existing in a frame.

However, in the above-described conventional method in which frame images are sequentially recorded on a video film, images of several hundreds of frames are required even for generating animation for several tens of seconds. Accordingly, several hours are required for generating one continuous scene, and consequently, the generation efficiency is very poor. In addition, during the generation process, it is impossible to review the outline of animation which is being generated and to partially change the animation which is being generated. Thus, the practicability and the interactivity are very low.

Moreover, in the key-frame interpolation, errors, such as an estimation error of a motion vector, may inevitably occur, so that it is difficult to realize smooth motion.

On the other hand, there is a different trend for generating 3-dimensional animation in amusement applications and in hobby applications for home use. In these applications, unlike the above-described CG applications requiring a high image quality, relatively low image quality can be allowed, but the interactivity with a user and the real time response to the instruction given by the user are strongly required.

In these applications, a different approach for generating a 3-dimensional animation is taken, for realizing the above purpose, compared with the usual CG application. For example, in usual CG images, an object existing in one scene is represented by using several thousands of polygons for which the processing is performed. In the amusement and hobby applications, on the other hand, the number of polygons to be processed is largely decreased and the object is approximated using 2-dimensional data. As a result, the required calculation amount is reduced, so that real time processing can be realized.

However, in such a method, the quality of generated images is necessarily deteriorated. Although the thus generated image is said to be "3-dimensional", it is actually a pseudo 3-dimensional image which is projected on a 2-dimensional plane. It should precisely be called a 2.5-dimensional image.

SUMMARY OF THE INVENTION

The 3-dimensional animation generating apparatus which draws a scene including an object having a 3-dimensional shape of this invention includes: an image data storing means for representing the object in approximation with one or more parts and storing image data relating to the respective parts, the respective parts being a group of polygons, the polygons representing a surface of the object; an image supervising means for supervising and searching the image data for each part as a minimum unit; a view point information input means for providing information on an observing view point from which the object is observed; an image data selecting means for selecting a visible image data which is visible from the observing view point among the stored image data by using the information on the observing view point provided from the observing view point information means; a view point coordinate transforming means for performing a coordinate transformation of the image data with respect to coordinates of the observing view point by using the information on the observing view point; and an output image drawing means for drawing the transformed image data on a drawing area.

In one embodiment, the polygons included in the respective parts are adjacent to each other and respective directions of respective normal vectors of the respective polygons fall within a predetermined range.

In another embodiment, the image data stored in the image data storing means are background image data and part image data of the respective parts with respect to a plurality of projected images which are respectively obtained by projecting the object onto a plurality of project surfaces from a plurality of reference view points, and the image data storing means stores the image data in a hierarchical structure, the image data being stored in association with 3-dimensional coordinates in a world coordinate system of respective vertexes of a figure existing in the respective projected images and being attached with an identification code indicative of additional information on the image data.

In still another embodiment, the image data selecting means judges a positional relationship between the observing view point and the image data through a positional relationship between the 3-dimensional coordinates of the vertexes and 3-dimensional coordinates of the observing view point, and searches the image data by utilizing the identification code.

In still another embodiment, the view point coordinate transforming means determines one vertex of the part in the image data to be processed as a reference vertex, and the coordinate transformation is performed with respect to vectors connecting the reference vertex and other vertexes of the part. Preferably, the view point coordinate transforming means removes a hidden surface formed by overlapping a plurality of transformed part image data for a plain produced by the vertexes of the part image data as a minimum unit, and processes interpolation for pixels excluding the vertexes in the part image data based on the original image data before the coordinate transformation.

In still another embodiment, the apparatus further includes a motion addressing means for providing motion data on a motion of the object, wherein the image data selecting means searches a specific part image data among the part image data stored in the image data storing means, the specific part image data corresponding to a specific part to be moved in relation to the motion of the object, and the view point coordinate transforming means transforms the searched part image data into a transformed part image data in a moved condition, the transformed part image data being drawn on the drawing area.

In still another embodiment, the apparatus further includes: a shadow area detecting means for detecting an area to be a shadow area by using the 3-dimensional coordinates of the vertexes of the parts in the stored part image data and the 3-dimensional coordinates of a light source; and a shadow area supervising means for supervising image data of the shadow area, wherein a movement of the shadow area corresponding a movement of the observing view point is calculated by view point coordinate transformation of the part image data which provides the shadow area, the shadow area being drawn in the drawing area by decreasing luminance values of pixels included in the shadow area.

In still another embodiment, the image data storing means stores the image data in a plurality of hierarchical structures arranged sequentially along a time axis.

According to another aspect of the invention, the method for generating a 3-dimensional animation in which a scene including an object having a 3-dimensional shape is drawn includes the steps of: representing the object in approximation with one or more parts and storing image data relating to the respective parts, the respective parts being a group of polygons, the polygons representing a surface of the object; supervising and searching the image data for each part as a minimum unit; providing information on an observing view point from which the object is observed; selecting a visible image data which is visible from the observing view point among the stored image data by using the information on the observing view point provided; performing a coordinate transformation of the image data with respect to coordinates of the observing view point by using the information on the observing view point; and drawing the transformed image data on a drawing area.

In one embodiment, the polygons included in the respective parts are adjacent to each other and respective directions of respective normal vectors of the respective polygons fall within a predetermined range.

In another embodiment, the image data stored are background image data and part image data of the respective parts with respect to a plurality of projected images which are respectively obtained by projecting the object onto a plurality of project surfaces from a plurality of reference view points, and the image data is stored in a hierarchical structure and in association with 3-dimensional coordinates in a world coordinate system of respective vertexes of a figure existing in the respective projected images and being attached with an identification code indicative of additional information on the image data.

In still another embodiment, a positional relationship between the observing view point and the image data is judged through a positional relationship between the 3-dimensional coordinates of the vertexes and 3-dimensional coordinates of the observing view point, and the image data is searched by utilizing the identification code.

In still another embodiment, the step of performing the coordinate transformation further includes the step of determining one vertex of the part in the image data to be processed as a reference vertex, wherein the coordinate transformation is performed with respect to vectors connecting the reference vertex and other vertexes of the part.

Preferably, the method further includes the steps of: removing a hidden surface formed by overlapping a plurality of transformed part image data for a plain produced by the vertexes of the part image data as a minimum unit; and processing interpolation for pixels excluding the vertexes in the part image data based on the original image data before the coordinate transformation.

In still another embodiment, the method further includes the steps of: providing a motion data on a motion of the object; searching a specific part image data among the stored part image data, the specific part image data corresponding to a specific part to be moved in relation to the motion of the object; transforming the searched part image data into a transformed part image data in a moved condition; and drawing the transformed part image data being drawn on the drawing area.

In still another embodiment, the method further includes the steps of: detecting an area to be a shadow area by using the 3-dimensional coordinates of the vertexes of the parts in the stored part image data and the 3-dimensional coordinates of a light source; supervising image data of the shadow area; calculating a movement of the shadow area corresponding a movement of the observing view point by view point coordinate transformation of the part image data which provides the shadow area; and drawing the shadow area in the drawing area by decreasing luminance values of pixels included in the shadow area.

In still another embodiment, the image data is stored in a plurality of hierarchical structures arranged in a sequential manner along a time axis.

Thus, the invention described herein makes possible the advantage of providing an apparatus and a method for generating 3-dimensional animation by which 3-dimensional animation with a high image quality is easily generated in real time.

This and other advantages of the present invention will become apparent to those skilled in the art upon reading and understanding the following detailed description with reference to the accompanying figures.

DESCRIPTION OF THE PREFERRED EMBODIMENTS

Hereinafter, a 3-dimensional animation generating apparatus in one embodiment of the invention will be described with reference to the accompanying drawings.

Figure 1:
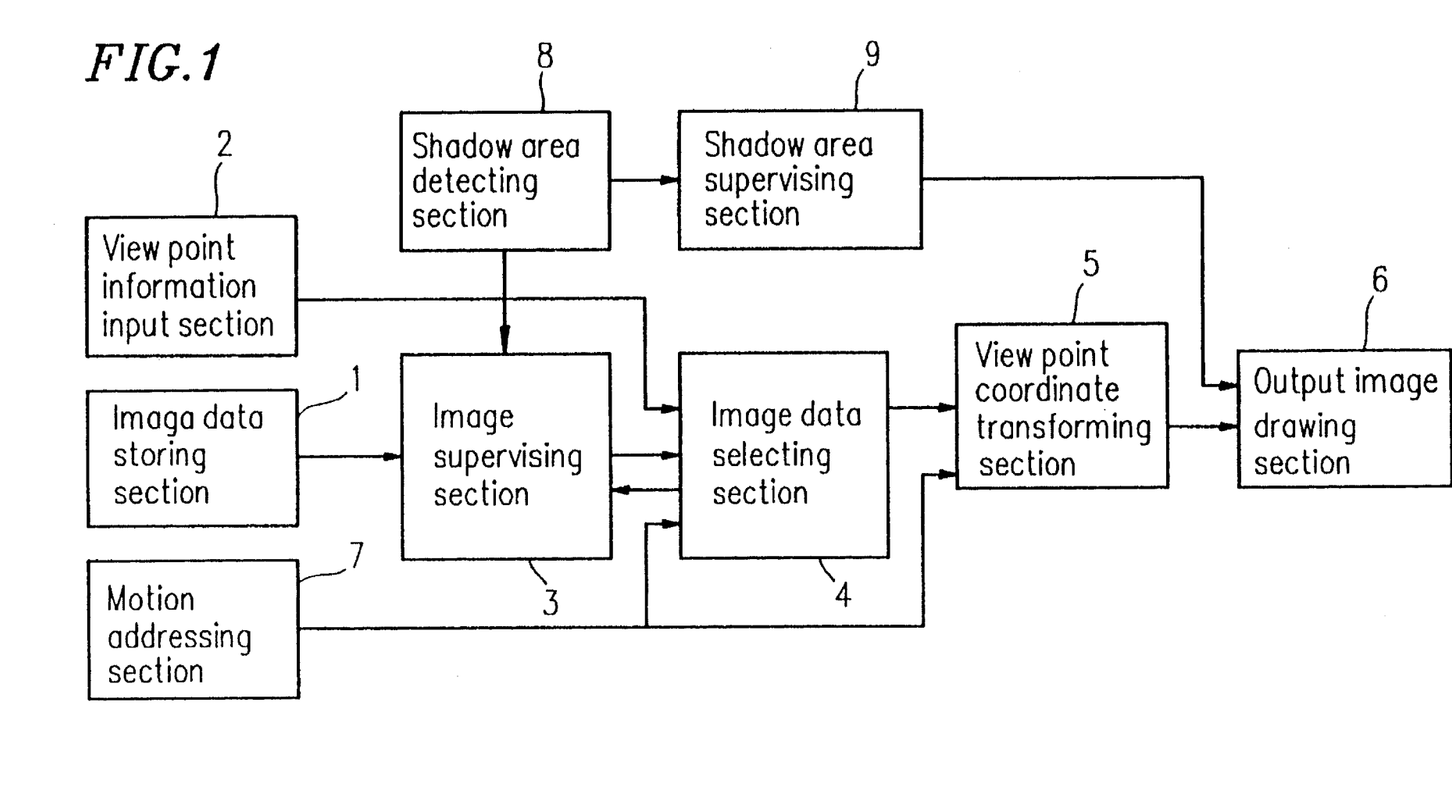
FIG. 1 is a block diagram for illustrating a construction of a 3-dimensional animation generating apparatus in one embodiment of the invention.

FIG. 1 schematically shows the construction of the 3-dimensional animation generating apparatus in this embodiment. As shown in FIG. 1, the apparatus includes an image data storing section 1, a view point information input section 2, an image supervising section 3, an image data selecting section 4, a view point coordinate transforming section 5, an output image drawing section 6, a motion addressing section 7, a shadow area detecting section 8, and a shadow area supervising section 9. Functions of the respective sections 1 to 9 and the operation of the 3-dimensional animation generating apparatus as a whole will be described below.

The image data storing section 1 stores image data of an object existing in a scene to be generated and image data of background (hereinafter referred to as background image data). In this invention, the image data of an object is obtained in the following manner. Each object is represented using "parts", and each part is observed from a plurality of reference view points. The observed resultant image is regarded as image data for each part of the object (hereinafter referred to as part image data).

The above-described features will be explained below in more detail.

Figure 2:
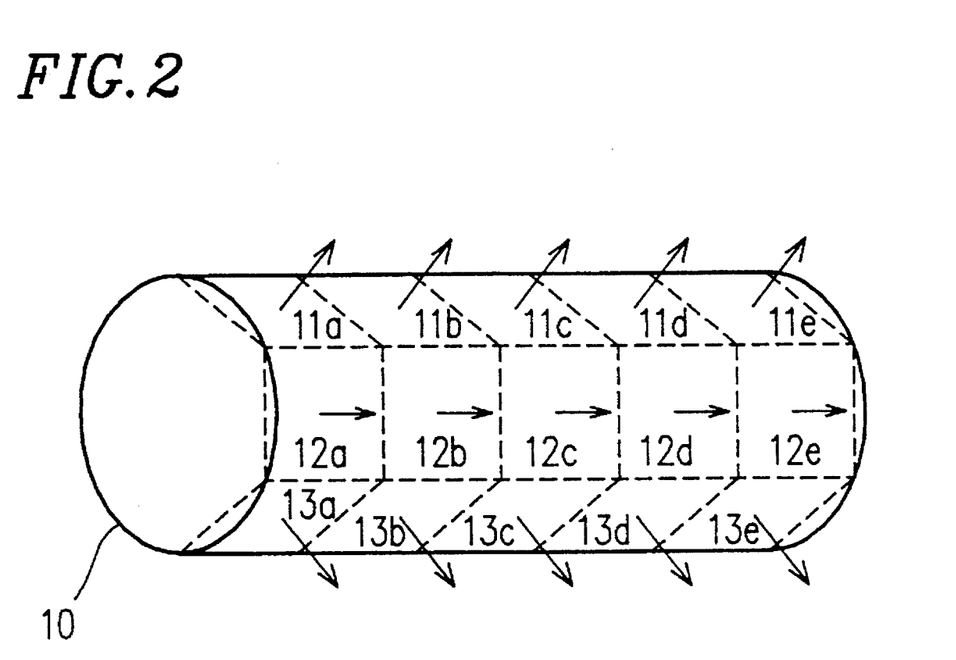
FIG. 2 is a schematic diagram for illustrating a method for representing a shape of an object in approximation.

In CG, for example as schematically shown in FIG. 2, the shape of an object 10 existing in the scene is generally represented in approximation by using a plurality of polygons 11a–11e, 12a–12e, and 13a–13e. The directions of the respective polygons 11a–11e, 12a–12e, and 13a–13e are indicated by normal vectors shown as arrows in FIG. 2.

In this invention, among these polygons 11a–11e, 12a–12e, and 13a–13e, the ones which are adjacent to each other and of which the directions of normal vectors fall within a predetermined range are regarded as a group and treated as one part. For example, as to the object 10 shown in FIG. 2, the polygons 11a–11e constitute a first part, in which the respective polygons 11a–11e included therein have the normal vector in the direction perpendicular to the drawing surface. Similarly, the polygons 12a–12e constitute a second part, and polygons 13a–13e constitute a third part.

In CG, the 3-dimensional coordinates of an object in the scene are known parameters. Thus, in association with the part image data, the image data storing section 1 actually stores vertex coordinates (3 dimensions) in the world coordinate system of the vertexes of each of the parts which are viewed from a plurality of arbitrarily selected reference view points.

The images obtained by viewing the object from the plurality of reference view points are images of respective parts when the scene is parallel-projected onto an imaginary surface. The positions of the plurality of reference view points are determined so that parts in the scene can be viewed, based on the positions of the view points actually selected by a user for observing the generated scene (hereinafter referred to as observing view points). The number, the positions, and the directions of the reference view points can be desirably selected.

Figure 3A:
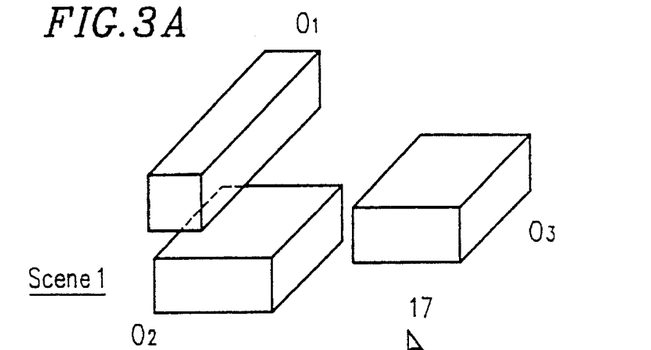
FIGS. 3A to 3C are schematic diagrams showing the relationships between an object and stored image data.

For example, consider a scene Scene1 in which three objects (rectangular parallelepipeds) $O_1$, $O_2$, and $O_3$ exist as shown in FIG. 3A. In 3-dimensional shape measurement, in order to observe the three objects $O_1$–$O_3$ in directions which are perpendicular to each other as indicated by arrows in FIG. 3B, three reference view points 15, 16, and 17 are typically selected. Hereinafter, the case shown in these figures is exemplarily described. If the scene Scene1 shown in FIGS. 3A and 3B is observed from the back side (i.e., in the reverse directions from those of the reference view points 15–17), it is necessary to use image data obtained from other reference view points.

Figure 3B:
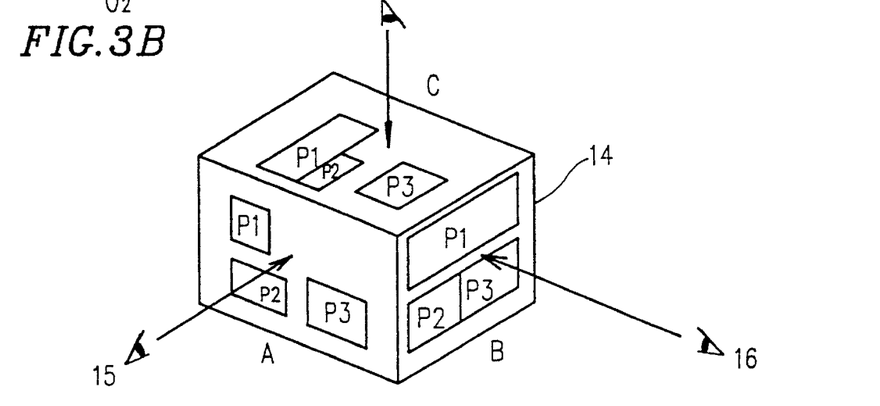
Figure 3C:
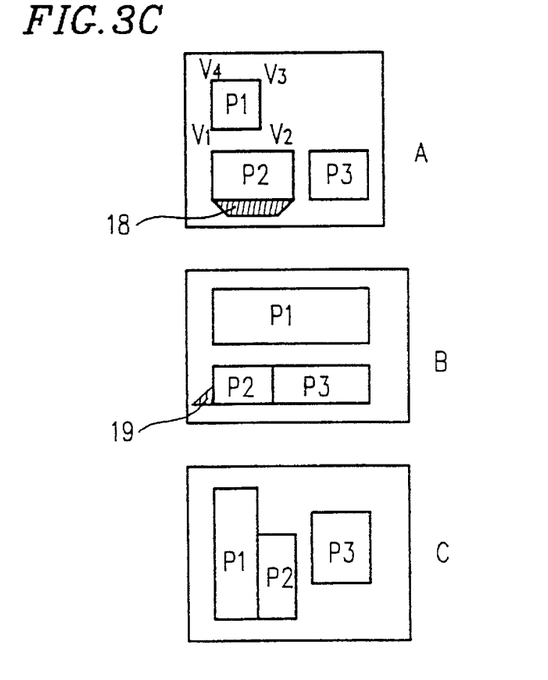

For the scene Scene1 shown in FIG. 3A, a boundary box 14 having an imaginary rectangular parallelepiped shape, as shown in FIG. 3B, is set. When the scene Scene1 is parallel-projected onto respective surfaces of the boundary box 14 from the three reference view points 15–17, which are in the directions perpendicular to each other, image data groups A–C as shown in FIG. 3C are obtained. The image data group A is obtained for the reference view point 15. In the image data group A, the objects $O_1$–$O_3$ are represented as parts $P_1$–$P_3$. Similarly, the image data groups B and C are obtained for the reference view points 16 and 17, respectively. In the image data groups A and B, shadow areas 18 and 19 are drawn for the object $O_2$, respectively.

The part image data includes the 3-dimensional coordinates of the vertexes of the respective parts $P_1$–$P_3$ in the image data groups A–C (for example, for the part $P_1$ in the image data group A in FIG. 3C, the vertexes are represented by $V_1$–$V_4$). Using the 3-dimensional coordinates of the vertexes, the positions of the respective parts $P_1$–$P_3$ are defined. On the other hand, the background image data A'–C' are the images obtained by removing the parts $P_1$–$P_3$ from the image data groups A–C shown in FIG. 3C.

For the scene Scene1, the background image data A'–C' and the respective part image data (hereinafter for simplification, the part image data are also indicated by $P_1$–$P_3$) are stored in association with the image data groups A–C in the image data storing section 1. The image data storing section 1 functions as a data area, so that it can be provided in a DRAM area or on a CD-ROM which can be referred from a CPU of a computer.

In the above-described example, the number of objects existing in the scene Scene1 is set to be 3, so that in each of the image data groups A–C, three parts $P_1$–$P_3$ are included. It may be possible that each of the image data groups A–C can be regarded as part image data.

Next, the function of the image supervising section 3 will be described.

Figure 4:
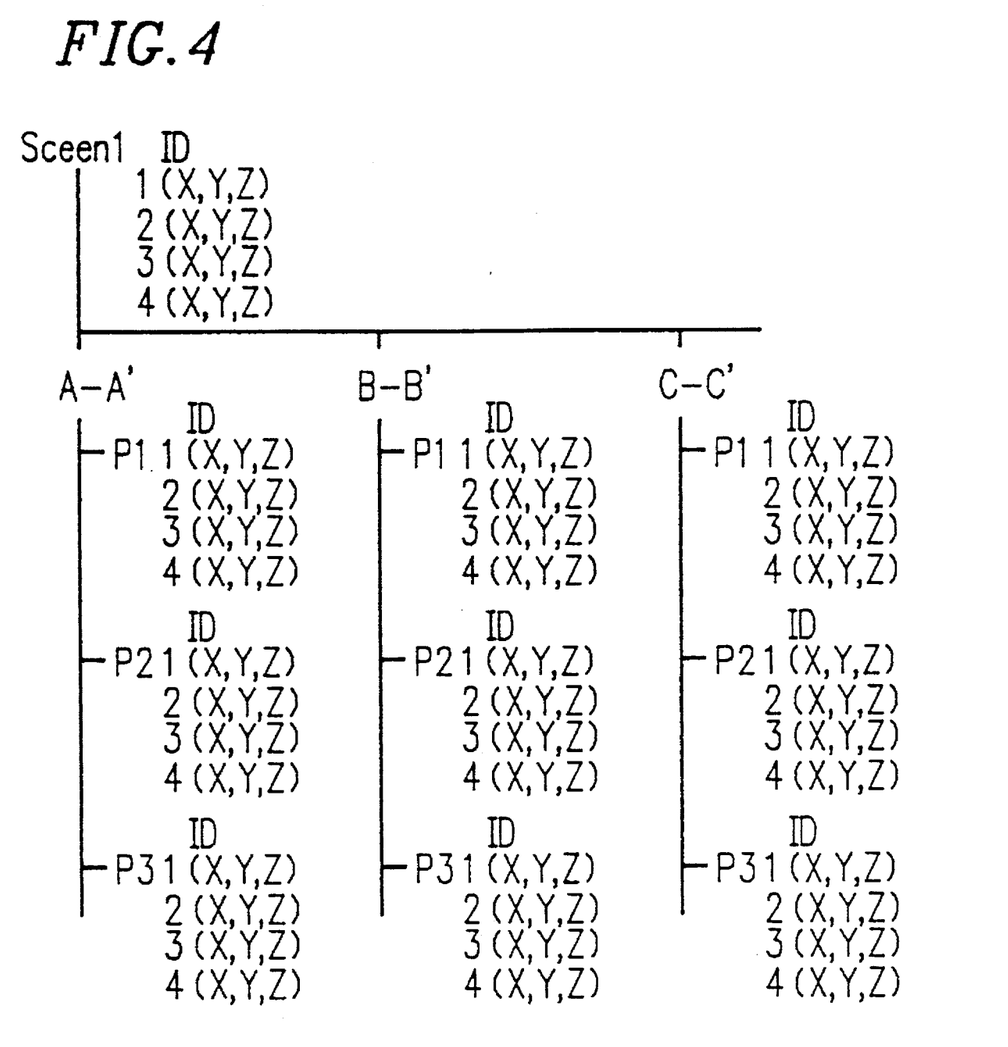
FIG. 4 is a diagram for illustrating a hierarchy used for storing and supervising the image data.

In the image supervising section 3, the above-described background image data A'–C' and the part image data $P_1$–$P_3$ are supervised in the hierarchy shown in FIG. 4. When the image generation is to be performed, the reference relationships of the image data are searched in accordance with the hierarchical data structure. These hierarchical relationships among the image data are preferably set depending on the complexity of the image, the required image quality level to be displayed, and the generation rate.

In the hierarchy, a scene (Scenel) serves as a root. In the hierarchical stages under the root, the image data groups A–C from the plurality of reference view points, and the part image data $P_1$–$P_3$ are positioned, respectively. In this hierarchy, each of the part image data $P_1$–$P_3$ is supervised so that the part image data includes the 3-dimensional coordinates (X, Y, Z) in the world coordinate system of the four vertexes of the corresponding part. For generating animation, these 3-dimensional coordinates are used, for example, for removing the background image, removing the hidden surface caused by overlapping of the part image data, and performing the view point coordinate transformation. Each of the part image data is attached with an identification code (ID) indicative of additional information as described later, so that the part image data can be rapidly searched.

The view point information input section 2 generates information related to the observing view points for observing the given scene Scenel, in accordance with the instruction from the user. The information related to the observing view points includes the positions of the observing view points in the world coordinate system, the direction vectors of the view directions, the view angles, the focal distances, and the like, and all of the coordinates are given in three dimensions. The information related to the observing view points input by the user at a certain time is converted into a required data format, such as in a matrix form, in the view point information input section 2, and then fed to the image data selecting section 4.

The image data selecting section 4 judges a positional relationship between the observing view point and the image data through a positional relationship between the 3-dimensional coordinates of the vertexes and 3-dimensional coordinates of the observing view point. More specifically, in the image data selecting section 4, based on the received information on the observing view points from which position the scene Scenel in FIG. 3A is observed, which part image data or which background image data can be viewed (in other words, which image data is visible) is calculated and searched. The search utilizes the background image data A'–C' and the 3-dimensional coordinates (X, Y, Z) of the vertexes of the part image data $P_1$–$P_3$, which are supervised by the image supervising section 3, as well as the information on the observing view points.

Figure 5:
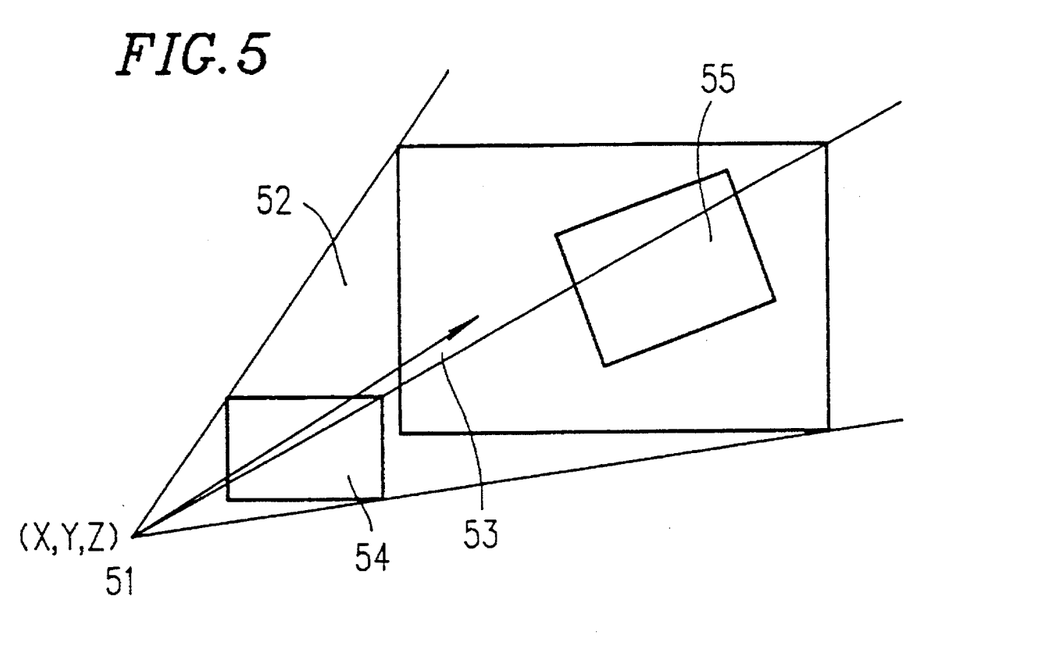
FIG. 5 is a schematic diagram for illustrating a method for detecting a visible area.

For example, when an object is observed from an observing view point 51 shown in FIG. 5, it is judged whether each part image data 55 is included in a view volume 52 of the observing view point 51 or not. If the part image data 55 is included in the view volume 52, the part image data 55 is judged to be visible. Herein, the view volume 52 is a range, which has a clipping plain such as a plain 54, defined depending on the information related to the selected observing view point 51, i.e., the coordinates thereof, the direction vector 53 of the view direction, the view angle, and the like, and the parts included in the view volume 52 can be viewed.

In order to perform a rapid judgment, the search is first performed using the direction vector of the view direction. For example, in the case of FIG. 3B, when viewed from a plane perpendicular to the image data group A, only the part image data included in the image data group A can be viewed. In this way, the background image data and the part image data which are visible from the selected observing view point 51 are searched. In addition, utilizing the identification code attached to the respective image data facilitates the searching procedure.

Figure 6A:
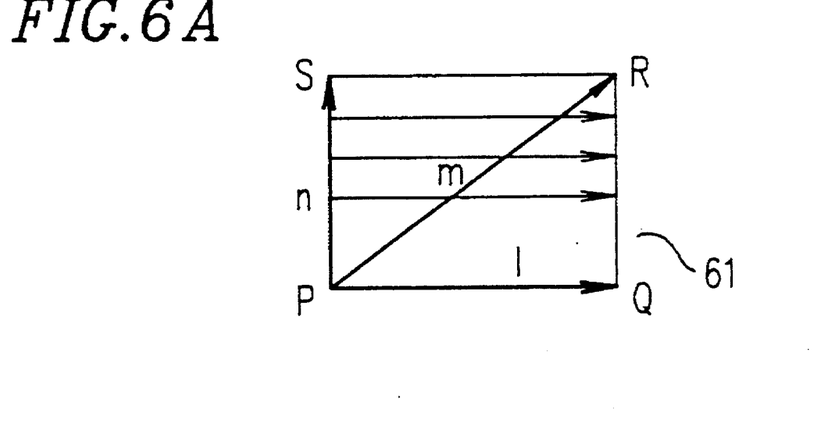
FIGS. 6A and 6B are schematic diagrams for illustrating view point coordinate transformation.

Next, for the image data which are judged to be visible, the view point coordinate transforming section 5 sequentially performs the view point coordinate transformation. As shown in FIG. 6A, first, a reference vertex P is determined for the part image data 61 to which the transformation is to be performed. Then, three vectors l, m, and n toward the remaining three vertexes Q, R, and S are assumed. For these three vectors l, m, and n, the view point coordinate transformation based on the selected view point position is performed, so that the vertex positions Q', R', and S' of the transformed part image data 62 projected on a screen (on the 2-dimensional coordinate system) can be obtained.

The view point coordinate transformation is realized by multiplying the 3-dimensional coordinates (X, Y, Z) of the respective four vertexes P, Q, R, and S of the part image data 61 by a predetermined view point coordinated transforming matrix (3 rows×3 columns). The operation is performed for all of the background image data and the part image data which are visible from the selected observing view point.

Figure 6B:
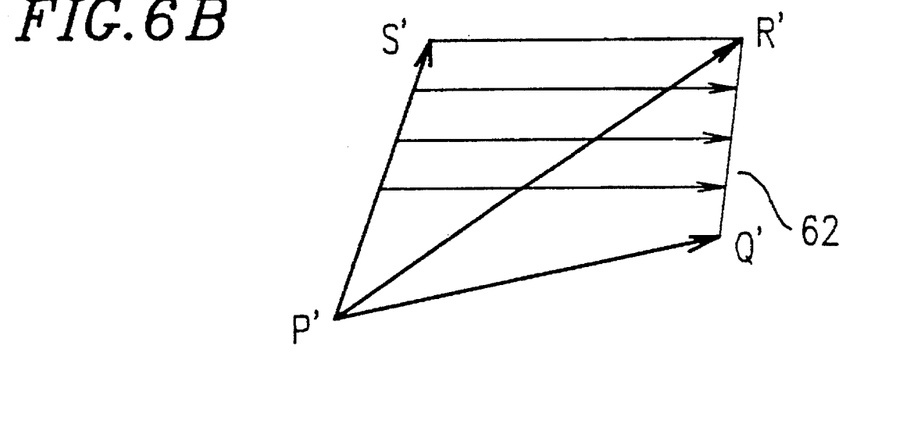
Figure 7:
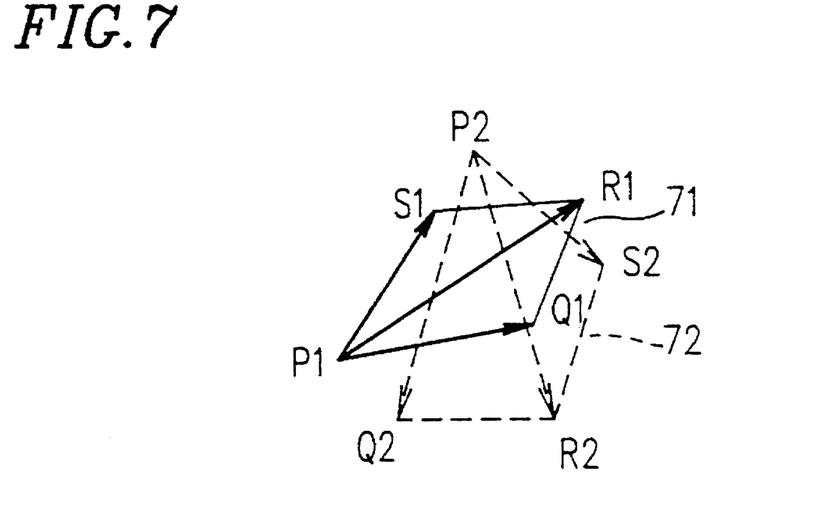
FIG. 7 is a schematic diagram for illustrating hidden surface removal.

If a plurality of the transformed part image data are overlapped, the hidden surface is removed in such a manner as shown in FIG. 7. As a result, one of the overlapped part image data is removed. The hidden surface removal in this example is performed for a plane defined by three vectors of the above-mentioned part image data as a minimum unit. An interpolating operation for pixels excluding the four vertexes is then performed based on the original image data before the coordinate transformation, for example, along lines indicated in FIGS. 6A and 6B by arrows.

As an example, it is assumed, as shown in FIG. 7, that a positional relationship in which a plane 71, including the vertexes $P_1$, $Q_1$, $R_1$ and $S_1$, and a plane 72, including the vertexes $P_2$, $Q_2$, $R_2$, and $S_2$, are overlapped. In this case, it is first judged whether or not each line segment (e.g., $P_2$–$Q_2$) constituting the plane 72 crosses the plane 71. If the line segment crosses the plane 71, the positional relationship between the planes 71 and 72, i.e., which is the front one, is determined based on the crossing relationship between the line segment and the plane. If the line segment does not cross the plane, the positional relationship between the planes 71 and 72 is determined based on the positional relationships among two vertexes $P_2$ and $Q_2$ and the plane 71.

In the case shown in FIG. 7, it is determined that the plane 71 indicated by a solid line is positioned in front of the plane 72 indicated by a broken line. In this case, it is judged that the entire plane 72 is not visible, so that only the plane 71 is drawn. Strictly speaking, some portion of the plane 72 is not hidden by the plane 71, rather, the portion is not drawn. As a result, although accuracy is slightly lowered, the hidden surface removal is rapidly performed.

The interpolation of pixels excluding the vertexes is a one-to-one mapping from a closed plane (the original image data before the coordinate transformation) to another closed plane (the transformed image data). Thus, the interpolation can be rapidly implemented in hardware by a general method such as a DDA (Digital Differential Analyze) method.

In the output image drawing section 6, all of the visible part image data, which have been subjected to the view point coordinate transformation and the hidden surface removal in the view point coordinate transforming section 5, are drawn in a common drawing area. The common drawing area can be set in a DRAM area or a frame memory which can be rapidly referred from the CPU.

When the frame memory includes a Z-buffer function, the hidden surface removal may not be required. In such a case, it is sufficient to add a predetermined Z value (determined by the results of the view point coordinated transformation for four vertexes) to the part image data, and to draw an image with the Z value included.

In addition, during the drawing, it may be realized that when a specific pixel value in the part image data has a special meaning, an area is made transparent, or an area is made to be not visible. This is an application of a method called α-blending. In addition, for example, by using an LUT (Look up Table) function of the frame memory, it is possible to make a specific pixel not visible when the pixel has a value (0, 0, 0). A rendering function can also be realized in the similar manner.

Next, a case where an object in the scene moves is considered.

In the image generation handled in this invention, which an object in the scene moves and to which position the object moves in the 3-dimensional space of the scene are previously known or can be identified. Thus, information regarding a motion of an object is available. Accordingly, the motion addressing section 7 converts the information as to which an object in the scene moves and how the object moves in the scene at a certain time in the series of animation, into the format of motion data based on the instruction from the user. The format of motion data can be, for example, in a motion matrix formed with respect to the four vertexes of the part image data. The motion data is delivered to the image data selecting section 4, so that the specific part image data corresponding to the part representing the moving object is searched.

The motion data is also delivered to the view point coordinate transforming section 5. The view point coordinate transforming section 5 calculates, by a matrix multiply, the moved part image data of the part to be moved at the currently selected observing view point position. Then, the view point coordinate transformation of the moved part image data is performed. formed.

During the drawing, the background image data is subjected to the view point coordinate transformation and then drawn. Then, the part image data of the parts, which have no relation to the moving object, is subjected to the view point coordinate transformation and then drawn under the conditions before the movement. Thereafter, the transformed part image data of the parts, to be moved with respect to new observing view points, is drawn in an overlapping manner under the conditions after the movement.

Figure 8A:
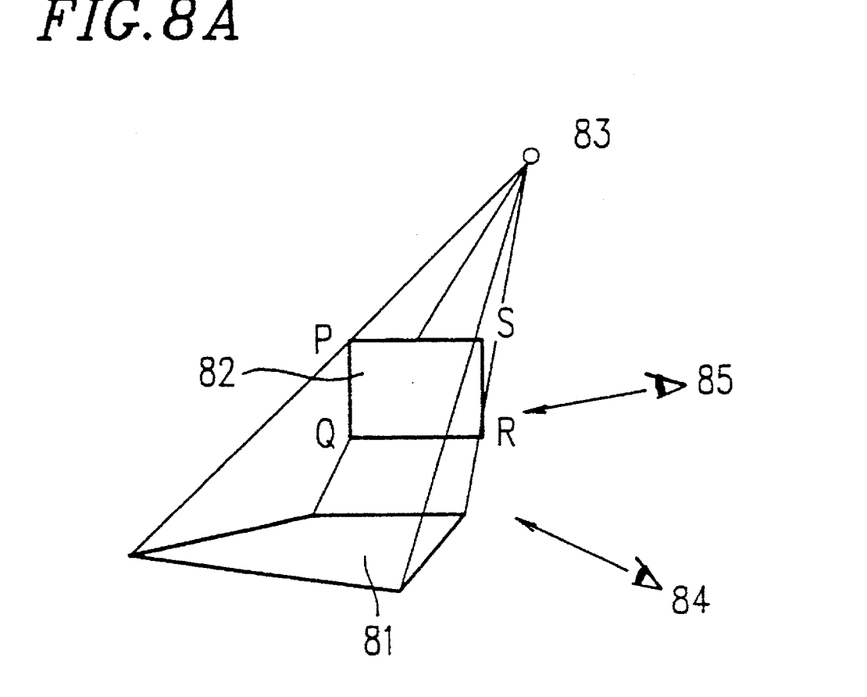
FIGS. 8A and 8B are schematic diagrams for illustrating a shadow area and view point coordinate transformation for the shadow area.
Figure 8B:
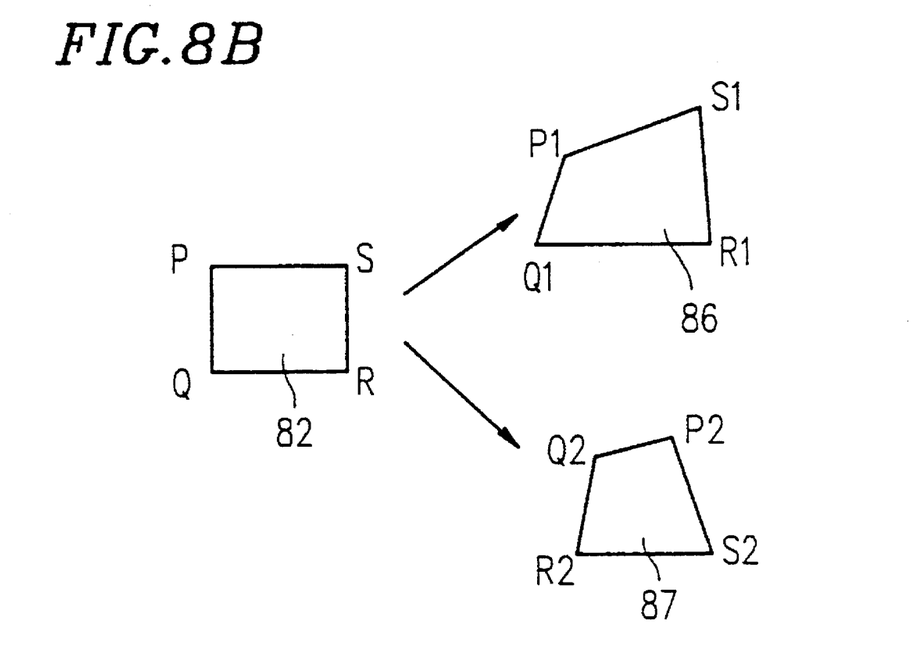

Next, with reference to FIGS. 8A and 8B, a case where a shadow area is to be drawn is considered.

A shadow area 81 is produced by irradiating a part in a scene which generates one part image data 82 with light from a light source 83. The shadow area 81 is detected by the shadow area detecting section 8 in the following manner.

The shadow area detecting section 8 first sets threshold values for luminance RGB values of a specified pixel in the image, by which the pixel is judged whether or not it is included in the shadow area 81. If all of the luminance RGB values of a pixel in the image are lower than the threshold values, the pixel is judged to be included in the shadow area 81. For the area which is determined to be the shadow area 81, by using the 3-dimensional position of the part (the vertex coordinate data included in the part image data 82) and the positional information of the light source 83, the part image data, which may provide a shadow as the shadow area 81 (i.e., which may cause the shadow area 81), is searched.

The searched light source and part image data are addressed using an identification code for each shadow area 81 and supervised by the shadow area supervising section 9 as a part of image data for the shadow areas. In this supervision, a hierarchy, which is the same as that used in the supervision of the image data described with reference to FIG. 4, is used.

When an object moves or when the observing view point is changed, the following process is performed. First, the part image data 82, which can provide a shadow as the shadow area 81, is searched. Using the identification code, the search can be rapidly performed. Next, the shape of the shadow area viewed from the new observation view point is calculated using the positional information of the light source 83 and the 3-dimensional coordinates of the four vertexes of the part included in the part image data 82 which can provide a shadow.

The transformation method is shown in FIG. 8B. For a shadow area 81, the part image data 82 which can provide a shadow and the light source 83 are being registered in the shadow area supervising section 9. In general, the shape of the shadow area 81 is a 2-dimensionally deformed shape of the part image data 82 which can provide a shadow. That is, the shape of the shadow area 81 and the 2-dimensionally deformed shape of the part image data 82 are associated with each other, for example, by means of affine transformation. Specifically, the shape of the shadow area 81 is determined by the coordinates of the vertexes P, Q, R, and S of the part image data 82 which can provide a shadow, the coordinates of the light source 83, and the position of the observing view point.

The shadow area, viewed from the view point 84, can be calculated by using the shape of the new part image data 86 which is obtained by performing the view point coordinate transformation of the four vertexes of the original part image data 82 (i.e., using a polygon including the vertexes $P_1$, $Q_1$, $R_1$ and $S_1$), Similarly, the shape of the shadow area viewed from the observing view point 85 can be calculated by using the part image data 87 (a polygon including the vertexes $P_2$, $Q_2$, $R_2$, and $S_2$) at the observing view point 85 obtained by performing the view point coordinate transformation of the original part image data 82. In this way, after the vertex coordinates of the shadow area viewed from a certain observing view point are obtained, the interpolation between the vertexes can be rapidly performed by using the same method as that shown in FIG. 6. As a result, the shape of the entire shadow area is determined.

The output image drawing section 6 may further include a drawing mechanism which lowers the luminance values of all pixels in the part image data 82 (i.e., makes up a shadow) during the interpolation. The mechanism may be realized, for example, by providing a mechanism which lowers the luminance values of a pixel by a predetermined amount if predetermined values (luminance values) are set in the form of a look up table (LUT).

An area which is not shaded and an area which has no relation with the motion are drawn on the basis of the information of the part image data before the movement. The background for the moved shadow area 81 is previously drawn in the common area by previously performing the view point coordinate transformation of the background image data A'-C' before drawing the moved image.

In the embodiment of the invention described above, a boundary box 14 having a rectangular parallelepiped shape has been set so as to surround the object, while setting the reference view points in three directions which are perpendicular to each other. The object is parallel-projected onto the surface of the boundary box 14 so as to obtain the image data. It is appreciated that the number of reference view points and the positional relationship among the view points are not limited to those described in the embodiment.

Figure 9:
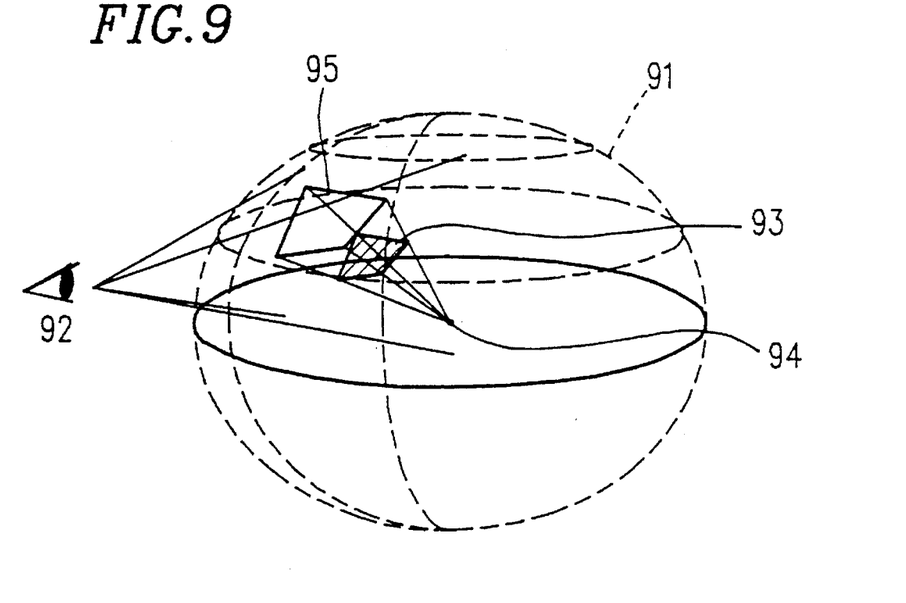
FIG. 9 is a schematic diagram for illustrating another embodiment of the invention which utilizes a sphere for obtaining part image data.

For example, instead of the boundary box 14 shown in FIG. 3B, an imaginary sphere 91 as shown in FIG. 9 may be employed. By dividing the surface of the sphere 91 using latitudes and longitudes, a point on the sphere 91 is defined by using a spherical coordinate system. Any remote points surrounding the sphere 91 are selected as view points.

Under the above-mentioned conditions, consider the image data obtained by observing a part 93 in the sphere 91 from a view point 92. For this purpose, an image 95, obtained by projecting the part 93 onto each divided surface area of the sphere 91 from the center 94 thereof, is stored. In this case, the image 95 for each area is the image data when the part 93 is viewed from various view points.

When the view point is changed, an area which is visible from a new view point is searched, and the image is drawn. As a result, an image from any desired view point can be generated. In addition, when an object moves, only the moving object is projected. Then, the Z-value comparison is performed for the influenced area images, and the hidden surface removal is performed.

Figure 10:
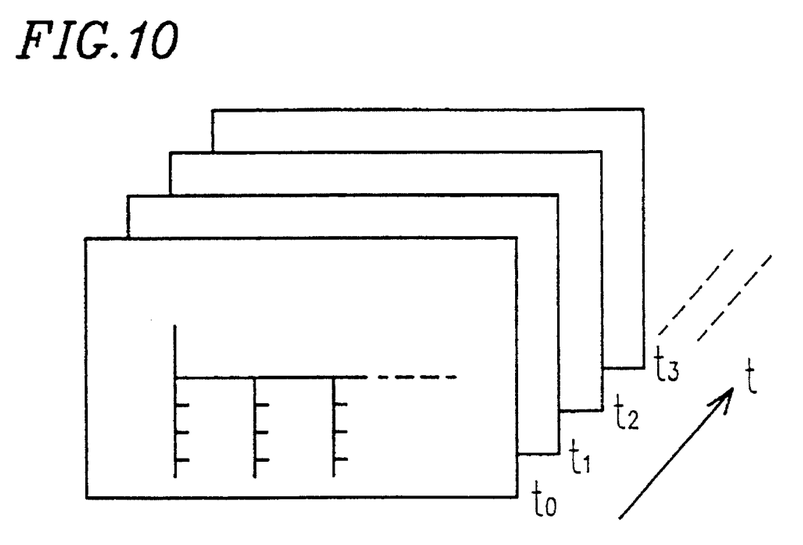
FIG. 10 is a diagram for illustrating another hierarchy used for storing and supervising the part image data.

In addition, in the above-described example, the image data at a certain time in the series of animation is recorded in the hierarchy shown in FIG. 4. In this case, the information related to the motion of the image is not recorded in the hierarchy, so that it is necessary to perform the above-described operation. In another case where a portion of the object constituting the scene exhibits a minor motion along a time axis such as walking or swinging, the image information at specific times (for example, $t=t_0, t_1, t_2, t_3, \ldots$) can previously be stored so as to include information on motion. A supervising mechanism for such a case can be constructed, for example, in such a manner as schematically shown in FIG. 10 so that the hierarchies at respective times are stored sequentially along a time axis.

As described above, the components of this invention include a mechanism for storing the background image data and the part image data when a 3-dimensional object in the scene is viewed from a plurality of reference view points as the vertex coordinate (3-dimensional) data in the image, and for searching the image data for each part. Also, the components of this invention include a mechanism for, when the information related to the observing view point is input, determining which part image data exists in the visible area, for transforming the visible part image data when it is observed from the observing view point by view point coordinate transformation, and for drawing it in a common drawing area. In addition, the part which can provide a shadow as a shadow area and the position of the light source related with the specific shadow area are searched and supervised. Furthermore, the components of this invention include a mechanism for transforming, when a new view point is selected, the shadow by view point coordinate transformation and for drawing it.

With the above-described construction, when animation viewed from any desired observing view point is to be generated, the part image data of the image, which is visible from the observing view point, is rapidly searched from the stored part image data viewed from a plurality of reference view points. Then, the searched part image data is transformed into the specified view point coordinates, whereby an image, which is deformed and pursed on a 2-dimensional screen, can be produced. By drawing a plurality of part image data in the common area after the view point coordinate transformation, the scene generation can be performed at a high speed. In addition, when shading or the like is required, since an area which is to be shadowed and the object (part) which can provide the shadow as well as the related light source are specifically supervised among the stored image data, the shadow area can be rapidly moved by deforming the shadow area even in the case where the view point is changed.

As described above, according to the invention, when a scene viewed from a specified observing view point is to be generated, the background image data, the part image data, and the vertex coordinates of the figure included in the image, which are obtained by viewing the scene from a plurality of reference positions, are stored, supervised and searched. Accordingly, the data amount required for generating the scene viewed from the specified observing view point can be efficiently reduced. In addition, when a new observing view point is selected, visible part image data is searched and the view point coordinate transformation is performed only for the searched data. Accordingly, the calculation amount can be greatly reduced, and it becomes possible to easily generate animation in real time. Also, the searching mechanism is provided for the shadow area, so that a part which has an influence on the shadow area and the related light source are rapidly searched and specified. Accordingly, even the change of observing view point or the motion of an object is involved, it is possible to move and draw the shadow area at a high speed. Moreover, the video data in the scene is stored as 3-dimensional data, so that a high quality image can be obtained, and the change of observing view point can be flexibly handled.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A 3-dimensional animation generating apparatus which draws a scene including an object having a 3-dimensional shape, the apparatus comprising:

an image data storing means for representing the object in approximation with one or more parts and storing image data relating to the respective parts, each respective part consisting of a plurality of polygons, the polygons representing a surface of the object, wherein the image data stored in the image data storing means are background image data and 2-dimensional part image data representing the respective parts as a plurality of projected images that are respectively obtained by projecting the object onto a plurality of projection surfaces from a plurality of reference view points, so that the object is expressed using the 2-dimensional part image data, and the image data storing means stores the image data in association with 3-dimensional coordinates in a world coordinate system of respective vertexes of a figure existing in the respective projected images;

an image supervising means for supervising and searching the image data while treating each of the parts as a minimum unit for supervising and searching;

a view point information input means for providing information on an observing view point from which the object is observed;

an image data selecting means for selecting a visible image data which is visible from the observing view point among the stored image data by using the information on the observing view point provided from the view point information input means;

a view point coordinate transforming means for performing a coordinate transformation of the selected visible image data with respect to coordinates of the observing view point by using the information on the observing view point; and an output image drawing means for drawing the transformed image data on a drawing area.

2. A 3-dimensional animation generating apparatus according to claim 1, wherein the polygons included in the respective parts are adjacent to each other and respective directions of respective normal vectors of the respective polygons fall within a predetermined range.

3. A 3-dimensional animation generating apparatus according to claim 1, wherein the image data storing means stores the image data in a hierarchical structure, the image data being stored with and associated with an identification code.

4. A 3-dimensional animation generating apparatus according to claim 3, wherein the image data selecting means judges whether each of the image data is included in a view volume of the observing view point by calculation using the 3-dimensional coordinates of the vertexes and 3-dimensional coordinates of the observing view point, and searches the image data which is judged to be included in the view volume as the visible image data.

5. A 3-dimensional animation generating apparatus according to claim 4, wherein the image data selecting means uses the identification code associated with the stored image data for searching.

6. A 3-dimensional animation generating apparatus according to claim 3, wherein the view point coordinate transforming means determines one vertex of a specific part included in the selected visible image data as a reference vertex, and the coordinate transformation is performed with respect to vectors connecting the reference vertex and other vertexes of the specific part.

7. A 3-dimensional animation generating apparatus according to claim 6, wherein the view point coordinate transforming means removes a hidden surface formed by overlapping a plurality of transformed part image data while treating a plane produced by the vertexes of the part image data as a minimum unit for removal, and performs interpolation calculation with respect to pixels included in the part image data excluding the vertexes thereof based on the original image data obtained before the coordinate transformation.

8. A 3-dimensional animation generating apparatus according to claim 3, further comprising a motion addressing means for providing motion data on a motion of the object, wherein the image data selecting means searches a specific part image data among the part image data stored in the image data storing means, the specific part image data corresponding to a specific part to be moved in relation to the motion of the object, and the view point coordinate transforming means transforms the searched part image data into a transformed part image data in a moved condition, the transformed part image data being drawn on the drawing area.

9. A 3-dimensional animation generating apparatus according to claim 3, further comprising:

a shadow area detecting means for detecting one of more areas each to be a shadow area by using the 3-dimensional coordinates of the vertexes of the parts in the stored part image data and the 3-dimensional coordinates of a light source; and a shadow area supervising means for supervising image data of each of the shadow areas, wherein a movement of a specific shadow area selected from the detected one or more shadow areas, corresponding to a movement of the observing view point, is calculated by view point coordinate transformation of the part image data which provides the specific shadow area, the specific shadow area being drawn in the drawing area by decreasing luminance values of pixels included in the Specific shadow area from original luminance values thereof.

10. A 3-dimensional animation generating apparatus according to claim 1, wherein the image data storing means stores the image data in a plurality of hierarchical structures arranged sequentially along a time axis.

11. A method for generating a 3-dimensional animation in which a scene including an object having a 3-dimensional shape is drawn, the method comprising the steps of:

representing the object in approximation with one or more parts and storing image data relating to the respective parts, each respective part consisting of a plurality of polygons, the polygons representing a surface of the object, wherein the stored image data are background image data and 2-dimensional part image data of the respective parts with respect to a plurality of projected images that are respectively obtained by projecting the object onto a plurality of projection surfaces from a plurality of reference view points so that the object is expressed using the 2-dimensional part image data, and the image data are stored in association with 3-dimensional coordinates in a world coordinate system of respective vertexes of a figure existing in the respective projected images;

supervising and searching the image data while treating each of the parts as a minimum unit for supervising and searching;

providing information on an observing view point from which the object is observed;

selecting a visible image data which is visible from the observing point among the stored image data by using the information on the observing view point provided;

performing a coordinate transformation of the selected visible image data with respect to coordinates of the observing view point by using the information on the observing view point; and drawing the transformed image data on a drawing area.

12. A method for generating a 3-dimensional animation according to claim 11, wherein the polygons included in the respective parts are adjacent to each other and respective directions of respective normal vectors of the respective polygons fall within a predetermined range.

13. A method for generating a 3-dimensional animation according to claim 11, wherein the image data are stored in a hierarchical structure and associated with an identification code.

14. A method for generating a 3-dimensional animation according to claim 12, wherein the step of selecting the visible image data further includes the steps of:

judging whether or not each of the image data is included in a view volume of the observing view point by calculation using the 3-dimensional coordinates of the vertexes and 3-dimensional coordinates of the observing view point; and searching the image data which is judged to be included in the view volume as the visible image data.

15. A method for generating a 3-dimensional animation according to claim 14, wherein in the step of searching the image data, the identification code associated with the stored image data is used for searching.

16. A method for generating a 3-dimensional animation according to claim 13, the step of performing the coordinate transformation further comprising the step of determining one vertex of a specific part included in the selected visible image data as a reference vertex, wherein the coordinate transformation is performed with respect to vectors connecting the reference vertex and other vertexes of the specific part.

17. A method for generating a 3-dimensional animation according to claim 14, further comprising the steps of:

removing a hidden surface formed by overlapping a plurality of transformed part image data while treating a plane produced by the vertexes of the part image data as a minimum unit for removal; and performing interpolation calculation with respect to pixels included in the part image data excluding the vertexes thereof based on the original image data obtained before the coordinate transformation.

18. A method for generating a 3-dimensional animation according to claim 13, further comprising the steps of:

providing a motion data on a motion of the object;

searching a specific part image data among the stored part image data, the specific part image data corresponding to a specific part to be moved in relation to the motion of the object;

transforming the searched part image data into a transformed part image data in a moved condition; and drawing the transformed part image data being drawn on the drawing area.

19. A method for generating a 3-dimensional animation according to claim 13, further comprising the steps of:

detecting one or more areas each to be a shadow area by using the 3-dimensional coordinates of the vertexes of the parts in the stored part image data and the 3-dimensional coordinates of a light source;

supervising image data of each of the shadow areas;

calculating a movement of a specific shadow area selected from the detected one or more shadow areas, corresponding to a movement of the observing view point, by view point coordinate transformation of the part image data which provides the specific shadow area; and drawing the specific shadow area in the drawing area by decreasing luminance values of pixels included in the specific shadow area from original luminance values thereof.

20. A method for generating a 3-dimensional animation according to claim 11, wherein the image data is stored in a plurality of hierarchical structures arranged in a sequential manner along a time axis.

* * * * *

UNITED STATES PATENT AND TRADE MARK OFFICE
CERTIFICATE OF CORRECTION

PATENT NO.   : 5,577,175
DATED        : November 19, 1996
INVENTOR(S)  : Toshiya Naka et al.

It is certified that error appears in the above-identified patent and that said Letters Patent is hereby corrected as shown below:

Column 6, line 44, "0n" should read --On--.

Column 8, lines 8 and 10 "1" (numeral 1) should read --l-- (lower case L).

Column 9, line 39, delete "formed."

Column 14, claim 9, line 13, before "shadow" change "Specific" to --specific--.

Column 14, claim 14, line 62, delete "12" and insert therefor --13--.

Column 15, claim 17, line 18, after "claim" delete "14" and insert --16--.

Signed and Sealed this

Eighth Day of April, 1997

Attest:

BRUCE LEHMAN

*Attesting Officer*   Commissioner of Patents and Trademarks